US009958695B2

United States Patent
Reznikov et al.

(10) Patent No.: US 9,958,695 B2
(45) Date of Patent: May 1, 2018

(54) SYSTEM AND METHODS FOR USING MODIFIED DRIVING WAVEFORMS TO INHIBIT ACOUSTIC NOISE DURING DRIVING OF A LIQUID CRYSTAL POLARIZATION ROTATOR

(71) Applicant: zSpace, Inc., Sunnyvale, CA (US)

(72) Inventors: Dmytro Yu Reznikov, Sunnyvale, CA (US); Mark F. Flynn, San Jose, CA (US); Chun Wun Yeung, Cupertino, CA (US)

(73) Assignee: zSpace, Inc., Sunnyvale, CA (US)

( * ) Notice: Subject to any disclaimer, the term of this patent is extended or adjusted under 35 U.S.C. 154(b) by 723 days.

(21) Appl. No.: 14/103,002

(22) Filed: Dec. 11, 2013

(65) Prior Publication Data

US 2015/0160491 A1    Jun. 11, 2015

(51) Int. Cl.
*G02B 27/26* (2006.01)
*H04N 13/04* (2006.01)

(52) U.S. Cl.
CPC ......... *G02B 27/26* (2013.01); *H04N 13/0434* (2013.01); *H04N 13/0497* (2013.01)

(58) Field of Classification Search
CPC ...... G02F 1/13306; G02B 27/26; G09G 3/36; G09G 2300/0495
See application file for complete search history.

(56) References Cited

U.S. PATENT DOCUMENTS

| | | | |
|---|---|---|---|
| 8,288,955 B2 | 10/2012 | Rowland | |
| 8,482,506 B2 * | 7/2013 | Kwok | G09G 3/3622 345/102 |
| 9,101,023 B2 | 8/2015 | Ota | |
| 9,119,257 B2 | 8/2015 | Yang | |
| 2007/0229951 A1 * | 10/2007 | Jung | G02B 27/26 359/465 |
| 2007/0279541 A1 * | 12/2007 | Mochizuki | G09G 3/3651 349/36 |
| 2008/0239176 A1 * | 10/2008 | Shestak | G02B 27/2264 349/15 |
| 2009/0315471 A1 | 12/2009 | Rowland | |
| 2010/0231699 A1 * | 9/2010 | Jalbout | H04N 13/0434 348/57 |
| 2012/0133630 A1 * | 5/2012 | Oh | G09G 3/3614 345/209 |
| 2014/0042919 A1 | 2/2014 | Yang | |
| 2014/0125243 A1 | 5/2014 | Ota | |

* cited by examiner

*Primary Examiner* — Kumar Patel
*Assistant Examiner* — Amy C Onyekaba
(74) *Attorney, Agent, or Firm* — Meyertons Hood Kivlin Kowert & Goetzel, P.C.; Jeffrey C. Hood (57) ABSTRACT

In some embodiments, a system and/or method may operate a liquid crystal device. The method may include increasing a voltage provided to a driven level to a liquid crystal addressable element of the liquid crystal device. Said increasing may be performed over a time period greater than 1 ms. The liquid crystal addressable element may be in a driven state at the driven level. The method may include reducing the provided voltage to a relaxed level. The liquid crystal addressable element may be in a relaxed state at the relaxed level. Said increasing the voltage over the time period to the driven level may result in a reduced acoustical noise associated with the provided voltage. In some embodiments, the liquid crystal device may include a three-dimensional (3D) display.

20 Claims, 6 Drawing Sheets

SYSTEM AND METHODS FOR USING MODIFIED DRIVING WAVEFORMS TO INHIBIT ACOUSTIC NOISE DURING DRIVING OF A LIQUID CRYSTAL POLARIZATION ROTATOR

BACKGROUND OF THE INVENTION

1. Field of the Invention

The present disclosure generally relates to operating liquid crystal devices and displays. More particularly, the disclosure generally relates to systems and methods for reducing acoustical noise associated with the operation of liquid crystal displays and especially associated with the operation of three dimensional liquid crystal displays using modified driving waveforms.

2. Description of the Relevant Art

Some of the advantages of a liquid crystal display (LCD) include lighter weight, lower power consumption, and less radiation contamination. LCD monitors have been widely applied to various portable information products, such as notebooks, mobile phones, PDAs, etc. Typically in an LCD monitor, incident light produces different polarization or refraction effects when the alignment of liquid crystal molecules is altered. The transmission of the incident light is affected by the liquid crystal molecules, and thus a magnitude of the light emitted from the liquid crystal molecules varies. The LCD monitor utilizes the characteristics of the liquid crystal molecules to control the corresponding light transmittance and produces images according to different magnitudes of red, blue, and green light.

Figure 1:
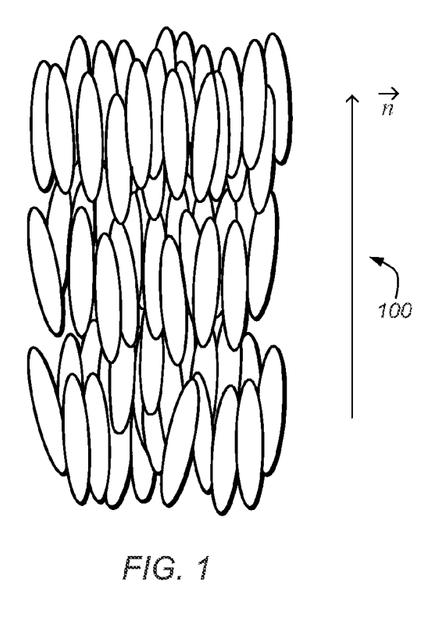
FIG. 1 depicts a diagram of an embodiment of a schematic diagram of a nematic liquid crystalline phase.

A schematic image of a nematic liquid crystalline phase 100 is shown in FIG. 1. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, $\vec{n}$ (see FIG. 1).

Figure 2:
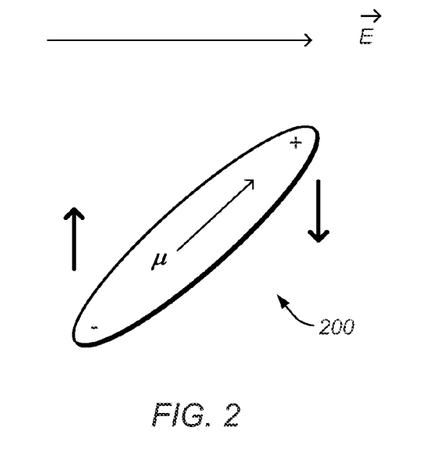
FIG. 2 depicts a diagram of an embodiment of a schematic diagram of a switching of a liquid crystal molecule in an electric field.

Liquid crystal molecules either possess a permanent dipole moment, or acquire the induced dipole moment when placed in an electric field. In both cases, in the electric field a liquid crystal molecule 200 is characterized by some dipole moment, $\mu$. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2 depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

Figure 3:
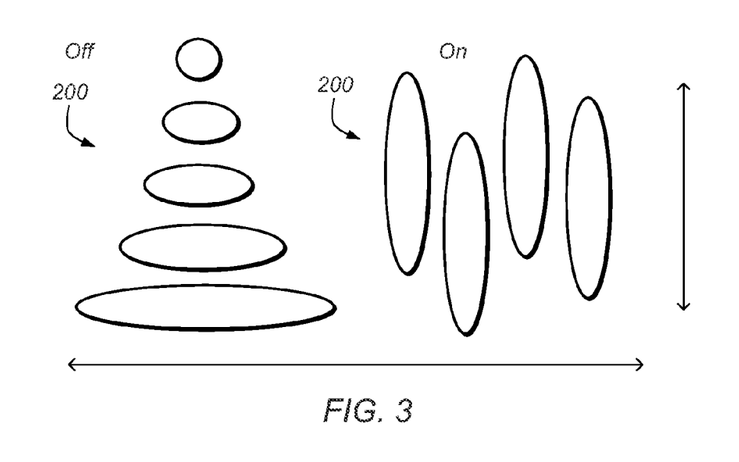
FIG. 3 depicts a diagram of an embodiment of a schematic diagram of a configuration of liquid crystal molecules within a conventional twisted nematic liquid crystal based polarization rotator.

FIG. 3 illustrates the configuration of liquid crystal molecules 300 within a conventional twisted nematic liquid crystal based polarization rotator. The nematic liquid crystal is chosen to have a positive dielectric anisotropy. The left hand side of the figure illustrates the voltage OFF, 90 degree rotation state. The right hand side of the figure illustrates the voltage ON, 0 degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e. the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardation of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in the both modes alternately in each every frame.

Figure 4A:
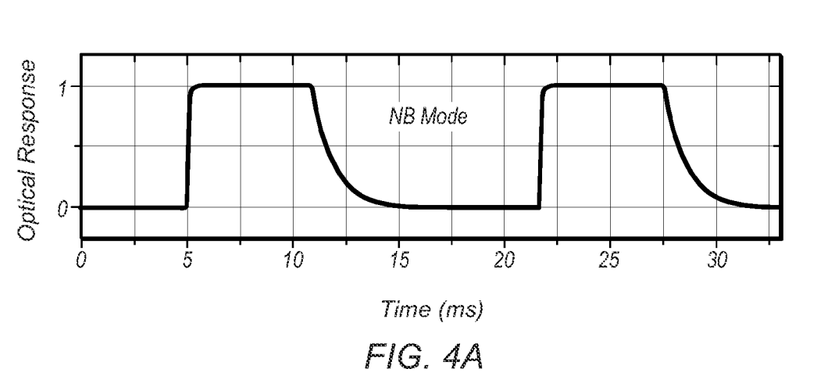
FIGS. 4A-C depict a diagram of an embodiment of a characteristic optical response to an applied square voltage waveform.
Figure 4B:
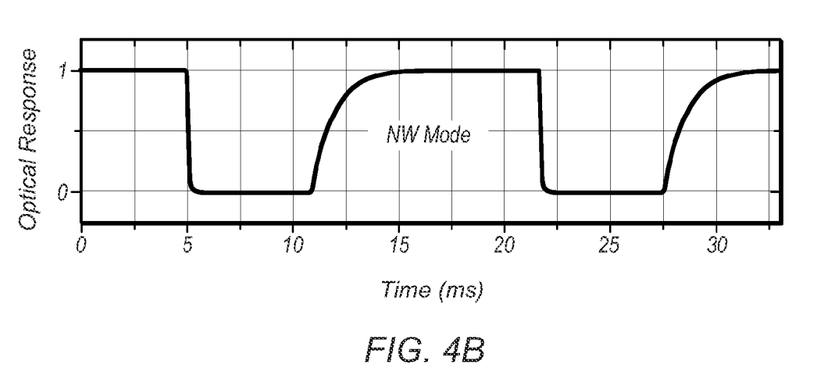
Figure 4C:
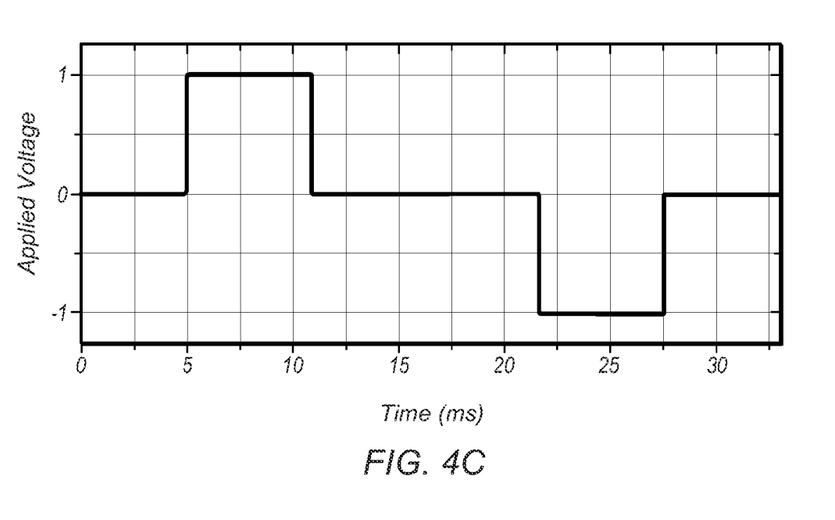

FIGS. 4A-C illustrate the standard "square wave" AC driving waveform (FIG. 4C) that is used in the simple driving schemes of an LCD, as well as the resulting optical response (FIG. 4A). It produces the fastest switching between the states of a liquid crystal cell.

In 3D systems based on the use of an on-screen polarization rotator, higher applied voltage frequently leads to better system performance, such as increased contrast and faster switching time.

In practice, in some cases higher driving voltage may lead to the unwanted acoustical noise effect ("buzzing"). This effect gets more noticeable for the large surface area and small cell gap liquid crystal cells, such as the aforesaid polarization rotator.

Therefore a system and/or method which results in lowering to a minimum or eliminating the level of the acoustical noise during the polarization rotator operation would be highly desirable.

SUMMARY

In some embodiments, a system and/or method may operate a liquid crystal device. The method may include increasing a voltage provided to a driven level to a liquid crystal addressable element of the liquid crystal device. Said increasing may be performed over a time period greater than 1 ms. The liquid crystal addressable element may be in a driven state at the driven level. The method may include reducing the provided voltage to a relaxed level. The liquid crystal addressable element may be in a relaxed state at the relaxed level. Said increasing the voltage over the time period to the driven level may result in a reduced acoustical noise associated with the provided voltage. In some embodiments, the liquid crystal device may include a three-dimensional (3D) display.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently performing on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "carrier medium" as used herein generally refers to a storage medium as described herein, as well as a physical transmission medium, such as a bus, network, and/or other physical transmission medium that conveys signals such as electrical, electromagnetic, or digital signals.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "driven state" as used herein generally refers to the high voltage state of an LC (e.g., +/−10 V, +/−12 V, etc.). As an example using a Twisted Nematic (TN) liquid crystal device, the driven state of the LC may correspond to the position and orientation of the LC such that the LC rotates the polarization of polarized light entering the liquid crystal device from the non-driven state in a manner that the polarization of the incoming light equals the polarization of the outgoing light.

The term "LC cell or LC layer" as used herein generally refers to the layer of LC material enclosed by the top and bottom substrates of an LC device.

The term "LC device" as used herein generally refers to an electro-optical device that uses an LC material to manipulate light by the application of a voltage.

The term "normal black" as used herein generally refers to a black optical state at 0V. Thus, if no voltage is applied, light may not be transmitted through a polarization switch (and LCs). A PS may be used in both a normal black and normal white mode simultaneously. For example, in a 3D system that alternates between left and right eye images, one eye may be the normal black eye and the other may be the normal white eye. Eyewear (e.g., passive eyewear or shutter glasses) may be used in conjunction with such a system. In context of an embodiment using the polarization switch and corresponding eyewear, where the two lenses of the two eyepieces of the eyewear are cross polarized, normal black means that, at the driven state of the PS, the lens that is at same polarization to the PS at the driven state is normally black (i.e. light passing through the PS is seen through normal black lens.)

The term "normal white" as used herein generally refers to a white optical state at 0V. Thus, normal white corresponds to a normally high luminance state at 0V where light is transmitted through a polarization switch (and LCs). One example of a normal white polarization switch includes 90° twisted nematic liquid crystals. In context of an embodiment using the polarization switch and corresponding eyewear, where the two lenses of the two eyepieces of the eyewear are cross polarized, normal white means that, at the relaxed state of the PS, the lens that is at same polarization to the PS at the relaxed state is normally white (i.e. light passing through the PS is seen through normal white lens.)

The term "pixel" as used herein generally refers to an individually addressable element of an LCD.

The term "polarization switch" as used herein generally refers to an LC device that manipulates the polarization of light passing through it. Note that the PS does not generally change the intensity of light on its own. It may typically be accomplished when the PS is used in conjunction with an analyzer. An analyzer may be a polarizer that is used to block or pass some predetermined polarization state. For example, an LCD typically has a polarizer on the input side and a polarizer on the output side. The output polarizer is called an analyzer. Eyewear may act as an analyzer in some embodiments.

The term "relaxed state" as used herein generally refers to the low voltage state of an LC (e.g., 0 V). As an example using a TN liquid crystal device, the relaxed state of the LC may correspond to the position and orientation of the LC such that the polarized light entering the LC rotates the polarization.

The term "storage medium" as used herein generally refers to any non-transitory/tangible storage media readable by a computer/processor to provide instructions and/or data to the computer/processor. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

In some embodiments, herein is a means to reduce the described buzzing by modification of the applied voltage waveform using a variable drive voltage.

Figure 5:
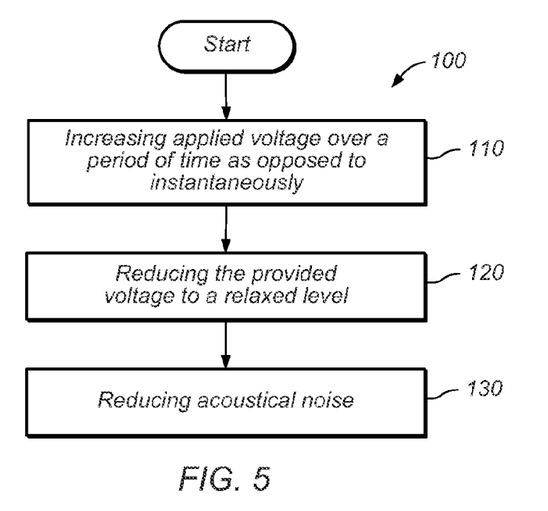
FIG. 5 depicts an embodiment of flow chart representing a method for reducing acoustical noise during operation of a liquid crystal device.

In some embodiments, a system and/or method may operate a liquid crystal device. FIG. 5 depicts an embodiment of flow chart representing a method 100 for reducing acoustical noise during operation of a liquid crystal device. The method may include increasing 110 a voltage provided to a driven level to a liquid crystal addressable element of the liquid crystal device. Said increasing may be performed over a time period greater than 1 ms. The liquid crystal addressable element may be in a driven state at the driven level. The method may include reducing 120 the provided voltage to a relaxed level. The liquid crystal addressable element may be in a relaxed state at the relaxed level. Said increasing the voltage over the time period to the driven level may result in reducing 130 acoustical noise associated with the provided voltage. In some embodiments, the liquid crystal device may include a three-dimensional (3D) display.

Figure 6A:
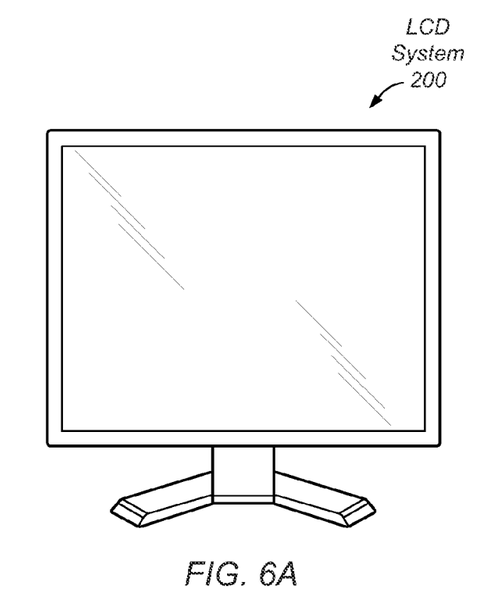
FIGS. 6A-6C depict example liquid crystal systems that may incorporate a variable drive voltage, according to some embodiments.
Figure 6B:
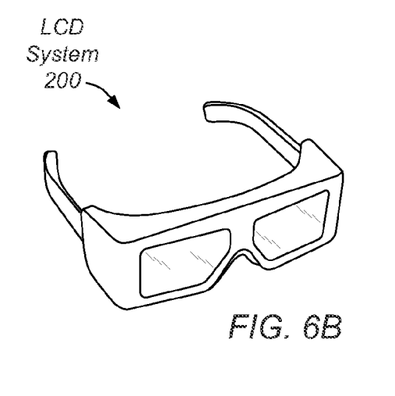
Figure 6C:
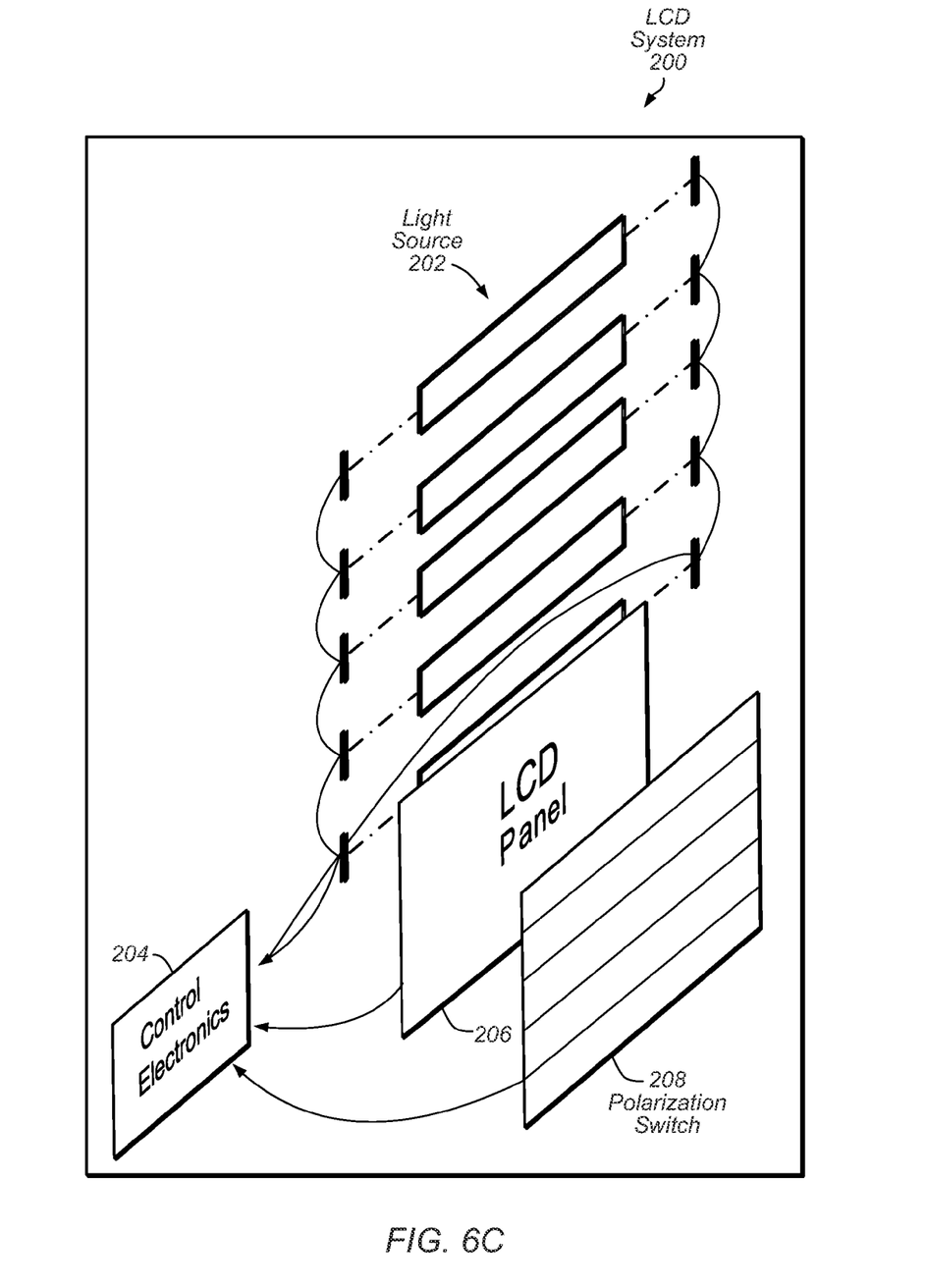

FIGS. 6A-C illustrate example liquid crystal display (LCD) systems that may incorporate a variable drive voltage, and which may be configured to perform various embodiments described herein below. As examples of systems that may incorporate a variable drive voltage, FIGS. 6A-C illustrate an LCD television as well as shutter glasses. The shutter glasses may implement a variable drive voltage or may be standard shutter glasses that may be used with an LCD television that implements the variable drive voltage. Other systems that drive twisted-nematic pixels may also incorporate a variable drive voltage, such as an organic light emitting diode (OLED) system that includes a polarization switch. In one embodiment, LCD system 200 may include light source 202, control circuitry 204, LCD panel 206, and a liquid crystal device, such as polarization switch 208.

In one embodiment, light source 202 may be coupled to control electronics 204, LCD panel 206, and polarization switch 208. Light source 202 may receive power and/or control indications from control circuitry 204. In turn, light source 202 may provide light to LCD panel 206 and polarization switch 208. Light source 202 may be referred to as a backlight. In one embodiment, light source 202 may include a plurality of light emitting diodes (LEDs) that may provide pulses of light to various components of LCD system 200. The backlight may, in various embodiments, be segmented. In one embodiment, the backlight may be segmented into five independently addressable rows. For instance, light source 202 may be segmented into sections that may extend across horizontal bands of the display. The LEDs of light source 202 may pulse at different times, which may be optimized for timing one segment's pulse separate from other segments. Further, a segmented light source 202 may include segmented lightguides that may help minimize row-to-row crosstalk. Light source 202 may be positioned in LCD system 200 behind LCD panel and polarization switch from the perspective of the front of LCD system 200 (where the viewer would be). In one embodiment, the LEDs may be edge LEDs that provide illumination from both sides of LCD system 200. Light source 202 may redirect the illumination from the edge LEDs so that the illumination may be perpendicular to LCD panel 206 and polarization switch 208. LCD system 200 may additionally include an enclosure that may include heatsinks for the LEDs. In that manner, heat produced by the LEDs may be dissipated and alleviate the effects on other LCD system 200 components, such as polarization switch 208. As described herein, light source 202 may be shifted, or extended, in conjunction with the variable drive voltage, according to some embodiments. In an embodiment in which the system is shutter glasses, the shutter glasses may not require any backlight pulsing. As such, an accompanying LCD as part of such a system may include a backlight capable of being pulsed, or in some embodiments, it may include a light source that is incapable of being pulsed (e.g., a CCFL).

In one embodiment, LCD system 200 may include control circuitry 204. Control circuitry 204 may receive a voltage from a voltage source (not shown). Control circuitry 204 may, in turn, provide one or more voltages and/or other indications to light source 202, LCD panel 206, and/or polarization switch 208. As an example, control circuitry 204 may provide a voltage and a backlight enable indication to light source 202, which, in turn, may cause light source 202 to provide a light pulse to LCD panel 206 and polarization switch 208. In one embodiment, control circuitry 204 may independently address different segments of light source 202, LCD panel 206, and polarization switch 208. For example, control circuitry 204 may provide a voltage and a backlight enable indication to a backlight driver board (not shown) of light source 202. Light source 202 may then provide appropriate pulsed voltages to each independently addressable segment of light source 202. In some embodiments, control circuitry 204 may provide a pulsed voltage directly to each segment of LEDs, without necessarily providing the voltage to a backlight driver board. The addressed light source 202 segment may then provide one or more light pulses to LCD panel 206, and polarization switch 208. Control circuitry 204 may include circuitry to implement one or more variable drive voltages to polarization switch 208, according to some embodiments.

LCD panel 206 may include a plurality of pixels that may collectively produce images. The plurality of pixels of the LC panel may be addressed with data that conveys the image to be displayed. In one embodiment, LCD panel 206 may be updated from one frame to the next in a progressive scan manner, and hence updating may not occur all at once. In such an embodiment, the pixels of LCD panel 206 may be updated, for example, sequentially by row from top to bottom. As an example, LCD panel 206 may refresh at a frequency of 120 Hz. For a 120 Hz system, every 8.3 ms the entire panel's data may be updated. The transition from one frame to another may proceed as a progressive scan; the scan may start at the top row, and then proceed through the rest of the rows. In one embodiment, the time difference from updating the top row to updating the bottom row may be approximately 5-6 ms. Accordingly, the scan time to write frame data to LCD panel 206 may take a large portion of each frame. As a result, the portion of each frame where the entire display is in the same state may be minimal. The subsequent frames may be a left eye frame (image) followed by a right eye frame (or vice versa) for a 3D display, or may simply be sequential frames for a 2D display. In one embodiment, backlight and polarization switch segmenting may be applied to maintain synchronization with the progressive scan data write of LCD panel 206. As described herein, an OLED panel may be used in LCD system 200 instead of LCD panel 206 and light source 202. The OLED-based system may likewise benefit from the variable drive techniques described herein. Other imagers, such as a cathode ray tube (CRT), rear projection, or any other imagers may also benefit from the variable drive techniques described herein.

LCD system 200 may include a liquid crystal device, such as polarization switch 208. Polarization switch 208 may use a twisted-nematic liquid crystal mode and may include a plurality of distinct individually addressable elements, called segments. Polarization switch 208 may receive one or more voltages from control circuitry 204 and may receive a light pulse from light source 202. As was the case with light source 202, polarization switch 208 may be segmented into horizontal bands. Polarization switch 208 may be used in LCD system 200 to simultaneously provide a normal black and normal white mode, when used in conjunction with the appropriate eyewear, wherein each eye has the appropriate lens. For instance, in the context of an embodiment using the polarization switch and corresponding eyewear, where the two lenses of the two eyepieces of the eyewear are cross polarized, a normal white mode may be provided in a 3D LCD system 200 for one eye, while concurrently a normal black mode may be provided for the other eye. Polarization switch 208 may control the luminance of LCD system 200. Thus, a normal white mode may allow full luminance in a low voltage state (e.g., 0V) of polarization switch 208 while normal black mode may block all luminance for the corresponding lens of the eyewear. Conversely, a normal white mode may block all luminance in a driven voltage state (e.g., +/−12V), while a normal black mode may allow full luminance for the corresponding lens of the eyewear. Accordingly, in a 3D context, one eye may see an image or frame in a normal white mode while the other eye sees an image or frame in a normal black mode. In one embodiment, where the polarization switch is used in combination with the eyewear, a higher voltage in the driven state may result in a greater drop in luminance in the normal white state. As a result, higher contrast may be achieved with a high voltage, such as +/−12 V, +/−20 V, etc. In some embodiments, polarization switch 208 may be a multi-segment polarization switch, as described herein.

Figure 7:
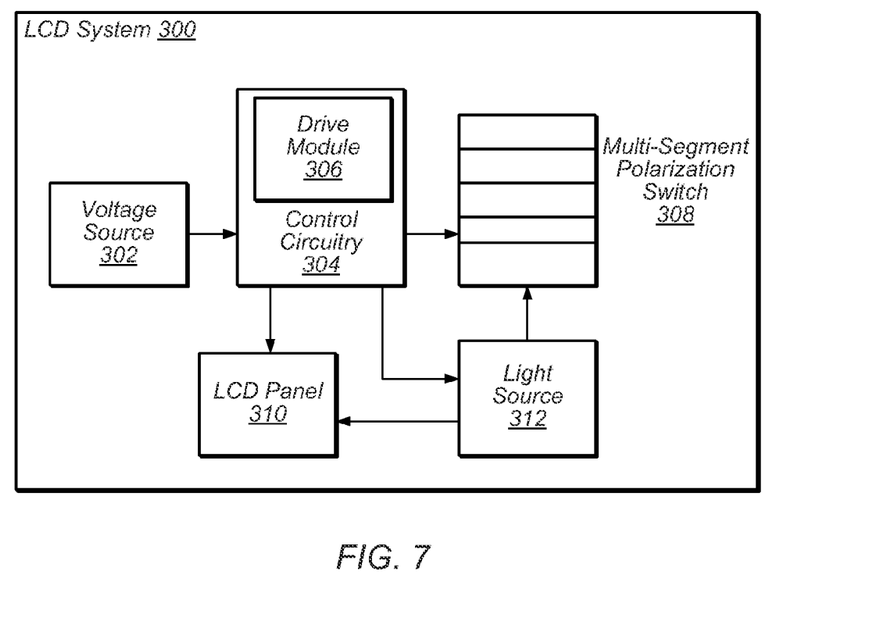
FIG. 7 depicts a block diagram illustrating one embodiment of a liquid crystal display system that may incorporate a variable drive voltage.

FIG. 7 is a block diagram illustrating one embodiment of the LCD system of FIG. 6, which may be configured to perform various embodiments described below.

In the illustrated embodiment of FIG. 7, LCD system 300 may include voltage source 302, control circuitry 304, liquid crystal devices, such as a polarization switch 308, shown as segments of a multi-segment polarization switch, LCD panel 310, and light source 312. Control circuitry 304 may include drive module 306.

In one embodiment, voltage source 302 may be a power supply for LCD system 300 or may receive one or more voltages from an external power supply. Voltage source 302 may output one or more voltages. The one or more voltages may be provided to control circuitry 304. In some embodiments, voltage source 302 may also provide one or more voltages directly to LCD panel 310, light source 312, a polarization switch 308, or other components (not shown) of LCD system 300. The one or more voltages may be provided to control circuitry 304, and, in turn, to the polarization switch 308, may be a drive voltage. The illustrated embodiment shows control circuitry 304 and voltage source 302 as separate modules, yet, in some embodiments, voltage source 302 may be a subcomponent of control circuitry 304.

In one embodiment, control circuitry 304 may receive the voltage from voltage source 302 and provide a drive voltage to the polarization switch 308. The drive voltage provided to the polarization switch 308 may be provided to a LC addressable element of the polarization switch, or other LC device. In one embodiment, the drive voltage may be +/−12 V. In other embodiments, the drive voltage may be +/−10V, or +/−20 V, for example. In some embodiments, the drive voltage may maintain an overall DC bias of 0V across the LC over time. Control circuitry 304 may include drive module 306. Drive module 306 may include a programmable waveform generator. In one embodiment, drive module 306 may vary the drive voltage it provides to the one or more polarization switches 308 as a function of time. For example, the drive voltage may include a driven function portion and a relaxed function portion. The driven function may correspond to the portion of the drive voltage when transitioning from a low, or relaxed voltage, to a high, or driven voltage. Similarly, the relaxed function may correspond to the portion of the drive voltage when transitioning from a driven voltage to a relaxed voltage. In one embodiment, the relaxed function may be a normal step function while the driven function may be one or more of a number of alternative functions, not equivalent to a step function. In one embodiment, the driven function may be continuous, i.e., in an analog manner. For instance, the driven function may be an increasing portion of a Gaussian or cosine function. In some embodiments, the drive voltage function(s) may vary from frame to frame. For instance, LC response time may vary as a function of temperature. Accordingly, control circuitry 304 may include a temperature sensor that may affect the voltage level and/or shape of the drive voltage waveform.

Further, in various embodiments, the driven function may rapidly increase the drive voltage to an intermediate voltage before slowly increasing the drive voltage from the intermediate voltage to a driven voltage. Thus, the increase may occur at different rates, for example a first and second rate, with the second rate being lower than the first rate. In such embodiments, control circuitry 304 may drive the polarization switch 308 at full rate, then transition to a lower intermediate drive voltage in anticipation of the transition to the driven state.

In one embodiment, the full increase from the relaxed voltage to the driven voltage may be sufficiently slow to reduce the acoustical noise, yet fast enough to fit within the time constraints of LCD panel 310 updating. For example, for a 120 Hz LCD system, LCD panel 310 may be fully updated or refreshed every 8.333 ms. Thus, the full voltage transition may take less than 8.3 ms in such an example (or in other embodiments, in a time period less than a frame time/period). For instance, for an 8.3 ms frame time, the full voltage transition, from relaxed to driven, may take 3.5 ms+/−1 ms. In other examples (e.g., a 60 Hz or 240 Hz system), panel update time constraints may be different (e.g., 16.667 ms, 4.166 ms). Accordingly, the full voltage transition time may be different as well. In various embodiments, the full voltage transition make take less than 20 ms, 10 ms, 5 ms, 3 ms, etc., depending on various timing considerations. In various embodiments, the full transition from relaxed state to driven state may be performed over a time period greater than 1 µs and less than 20 ms.

The drive voltage applied to the polarization switch 308 may present as a variety of different waveforms and timings. For example, the waveform could be an arbitrary increasing waveform, a linear increasing ramp, or other waveform. Some factors that may be considered in determining the waveform and timing may include: contrast level, the presence of ghosting/crosstalk, balance between left and right eye performance, and color in bright and dark states. In some embodiments, the drive voltage swing and offset may be varied. Further, in some embodiments, the drive voltage may be a pulse-width modulated (PWM) waveform, as described herein.

In one embodiment, different drive voltages may be provided to different segments, of a segmented polarization switch 308. For instance, as described herein, a polarization switch 308 may be segmented into five different segments. A different phase-shifted drive voltage, each of which may have a function (e.g., cosine) applied to the high-low-voltage transition, may be provided to each of the segments. As an example, the provided voltage may be independently driven to provide each segment with an independent and time-shifted voltage from the independently driven voltages being provided to each other segment. In such an embodiment, the timing of the polarization switch transitions may be synchronized with the timing of the backlight pulses and the data of the frames.

In some embodiments, control circuitry 304 may supply one or more voltages and/or other indications to LCD panel 310 and light source 312, in addition to, the one or more polarization switches 308. The voltages may be driven in a different manner than the one or more voltages provided to polarization switches 308. As an example, control circuitry 304 may provide a voltage, and a power-on indication to LCD panel 310 and/or light source 312. Control circuitry 304 may also provide a backlight enable indication to light source 312. Control circuitry 304 may, in some embodiments, receive an indication of data writes to LCD panel 310, from LCD panel 310, or from another source (e.g., an external source such as a set-top box, Ethernet, Wifi, DVD player, Blu-Ray player, etc.). Control circuitry 304 may include circuitry to synchronize the drive voltage to the one or more polarization switches and to left and right frame timing. Control circuitry 304 may further include circuitry to synchronize backlight enable indications with left and right frame timing. Accordingly, the variable drive voltage, described herein, may be used in conjunction with a shifted or extended backlight, to enhance the benefits of the variable drive voltage. The extended backlight may be segmented, where each of the subsidiary segments of the main backlight pulse may be shifted accordingly. In some embodiments, and not shown in FIG. 7, control circuitry 304 may receive video, manipulate and process the video, and provide it to the LCD panel 310. Control circuitry 304 may generate an indication (e.g., Vsync) and data enable indication. The Vsync indication may be used to synchronize timing of the polarization switch and backlight segments, among other components. The data enable indication may indicate when data is written.

In one embodiment, one or more polarization switches 308, or other liquid crystal device with one or more liquid crystal addressable elements, may receive the drive voltage from control circuitry 304 (and drive module 306). As described above, the drive voltage may have a function applied to it before reaching polarization switches 308. In some embodiments, the one or more polarization switches 308 may receive a drive voltage directly from voltage source 302, which may or may not apply a function to the drive voltage. Polarization switches 308 may be a liquid crystal device, such as twisted-nematic panel, homogeneous cells, chiral-homeotropic LC cells, optically compensated birefringence (OCB) cells, pi-cells, etc.

In various embodiments, LCD system 300 may include only a single polarization switch. The polarization switch 308 may cover the entire display of LCD system 300. Accordingly, the single polarization switch 308 may change the polarization state of the light emitted by the display. For a 3D display, this may correspond to two different states: one polarization state that is passed by the right eye polarizer and blocked by the left eye polarizer and another polarization state that is passed by the left eye polarizer and blocked by the right eye polarizer. The polarization switch 308 may be segmented, for example, into horizontal sections, similar to the backlight segmenting described herein. Accordingly, by segmenting the polarization switch into horizontal sections, the correct polarization state may be achieved for corresponding data on LCD panel 310 at a given time. As one example, the polarization switch 308 may be divided into five horizontal sections of equal size. The various segments of polarization switch 308 may be synchronized or timed according to the progressive-scan-based panel write times. In one embodiment, a polarization switch 308 may switch states when the first row of the segment receives new data (i.e., when LCD panel 310 begins to write data to that row).

LCD panel 310 may include a plurality of pixels that may collectively produce images. The plurality of pixels may be addressed with data that may reflect the image to be display. As discussed herein, LCD panel 310 may be updated from one frame to the next in a progressive scan manner and may not occur all at once. In such an embodiment, the pixels of LCD panel 310 may be updated, for example, sequentially by row from top to bottom. As an example, LCD panel 310 may refresh at a frequency of 120 Hz. For a 120 Hz system, every 8.3 ms the entire panel's data may be updated. In one embodiment, the time to update the entire panel, from the top row to the bottom row, may be approximately 5-6 ms. Accordingly, the scan time to write frame data to LCD panel 310 may take a significant time percentage of each frame and the portion of each frame where the entire display is in the same state may likewise be minimal. In one embodiment, backlight and polarization switch segmenting timing and/or segmenting may be applied to maintain synchronization with the progressive scan data write of LCD panel 310.

In one embodiment, LCD system 300 may include a light source 312. Light source 312 may provide an instance (e.g., a pulse) of the light source to the polarization switch 308. Light source 312 may be a backlight, such as incandescent light bulbs, fluorescent lamps, or one or more light emitting diodes (LEDs). Light source 312 may include one or more white backlights or different colored backlights (e.g., RGB LEDs). Light source 312 may be positioned in LCD system 300 behind LCD panel 310 and polarization switch 308 from the perspective of the front of LCD system 300 (where the viewer would be). In one embodiment, the LEDs may be edge LEDs that provide illumination from both sides of LCD system 300. Light source 312 may include a manner in which to redirect the illumination from the edge LEDs so that the illumination may be perpendicular to LCD panel 310 and polarization switch 308. In some embodiments, light source 312 may pulse twice per frame time (i.e., once for a left eye frame and once for a right eye frame), with each pulse being a pulse of limited duration.

Light source 312 may, in various embodiments, be segmented. In one embodiment, the backlight may be segmented into five independently addressable rows. For instance, light source 312 may be segmented into sections that may extend across horizontal bands of the display. The LEDs of light source 202 may pulse at different times, which may be optimized for timing one segment's pulse separate from other segments.

Turning back to FIG. 7, one or more components of LCD display 300 may, in some embodiments, be implemented by a computer-readable storage medium, memory, or some other component. A computer-readable storage medium may be one embodiment of an article of manufacture that stores instructions that are executable by a processor. As an example, a computer-readable storage medium can be used to store instructions read by a program and used, directly or indirectly, to fabricate hardware for control circuitry 304, described above. For example, the instructions may outline one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may include a set of gates (e.g., defined in a synthesis library), which represent the functionality of control circuitry 304. The netlist may then be placed and routed to produce a data set describing geometric shapes to be applied to masks. The masks may then be used in various semiconductor fabrication steps to produce a semiconductor circuit or circuits corresponding to control circuitry 304.

In some embodiments, LCD system 300 may not include LCD panel 310 or light source 312. Instead, LCD system may include an organic light emitting diode (OLED) panel. In an OLED-based LCD system 300, all rows of the panel may be written simultaneously (i.e., not in a progressive scan manner). In such an embodiment, segmenting may not be used. Instead of using a backlight, control circuitry 304 may pulse the OLED panel itself. Further, the variable drive voltage of control circuitry 304 may be used with the OLED-based LCD system 300, in a similar manner, which may reduce the acoustical noise.

The ON-switching time of a liquid crystal cell (time that it takes the liquid crystal cell to switch from a low-voltage state to a high-voltage state; the OFF-time is the time that it takes the liquid crystal cell to switch from the high-voltage state to the low-voltage state) depends linearly on the voltage amplitude and inversely to the square of the cell gap. Therefore, the high voltage amplitude and the small cell gap lead to faster switching; together with the large surface area this may be the reason for the very fast changes in elastic and electric changes inside the liquid crystal cell. Such driving conditions may lead to the undesired audible buzzing noise.

ON- and OFF-times of a liquid crystal cells are typically different; while OFF-time depends only on the properties of the liquid crystal cell and liquid crystal material properties, the ON-time is also linearly dependent on the voltage amplitude. This leads to the asymmetric dynamic response of the liquid crystal cell when a simple square waveform is applied to the cell. This means that it may be possible to artificially slow down the ON-transition of the liquid crystal cell without sacrificing the system optical performance. In some embodiments, the voltage may be increased slowly over a time period (as opposed to a standard step function). In some embodiments, the voltage may be increased over a period of about 1 millisecond (ms). In some embodiments, the voltage may be increased over a period of time of about greater than 2 ms, greater than 3 ms or greater than 4 ms. Modified driving waveform with a "softened" ON-edge lowers the undesired buzzing to an inaudible level.

In some embodiments, the use of a modified driving waveform of a twisted nematic polarization rotator may reduce undesirable noise associated with LCDs. The modified waveform is designed to eliminate audible buzzing without sacrificing performance of the system, mainly, the 3D contrast ratio.

Figure 8A:
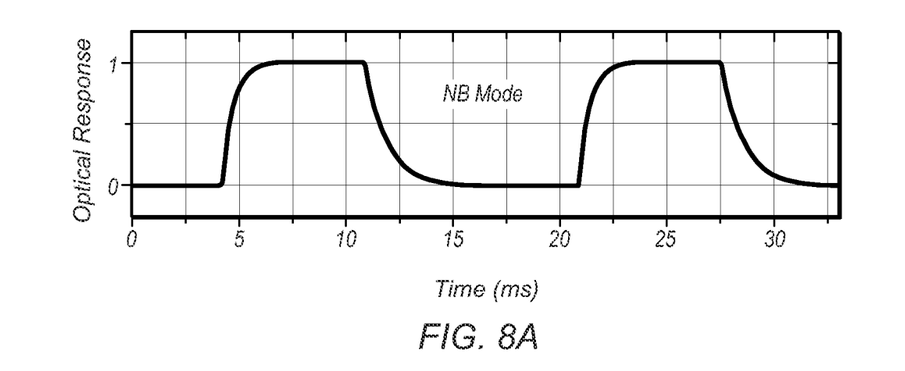
FIGS. 8A-C depict a diagram of an embodiment of a characteristic optical response to an applied square voltage waveform with the rising on-edge.
Figure 8B:
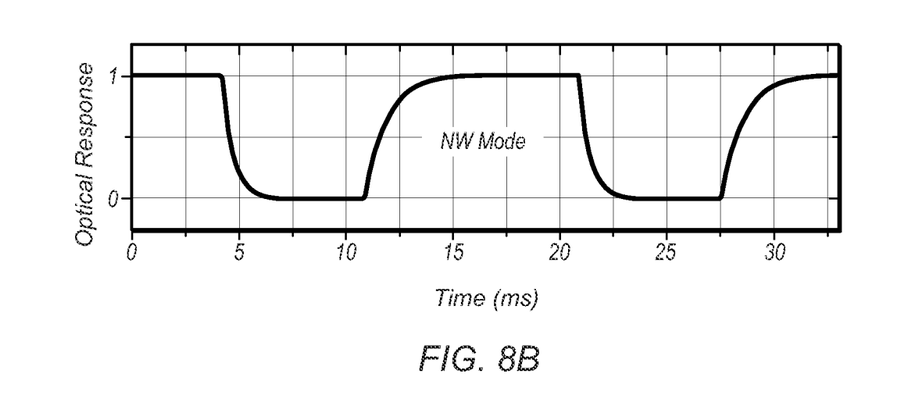
Figure 8C:
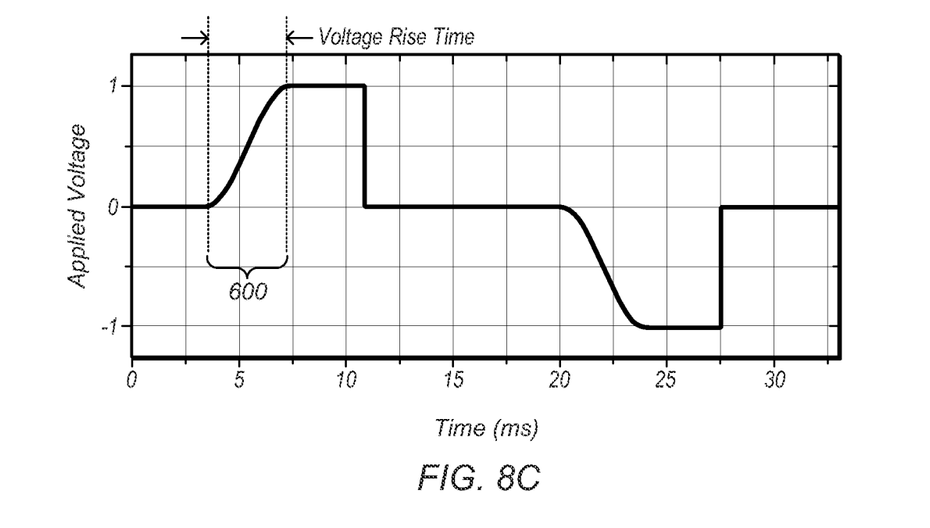

FIGS. 8A-C depict a diagram of an embodiment of a characteristic optical response to an applied square voltage waveform with the rising on-edge. The examples of the standard square driving waveform and the modified driving waveform with the "softened" ON-edge are shown in FIGS. 4C and 8C respectively. FIGS. 4A-B and 8A-B demonstrate the examples of the typical optical response of a liquid crystal cell with two polarizers operating in the Normal Black and the Normal White modes.

As the relaxation time of the liquid crystal generally weakly depends on the voltage that was applied to the cell before it was switched off, the OFF-edge of the driving waveform remained unchanged.

The "softened" ON-edge 600 of the driving waveform shown in FIG. 8C leads to the slower transition of the liquid crystal which leads to the slower optical response of the cell than in the case of the standard square waveform. However, in most cases the increased ON-time does not compromise the performance of the 3D system, as it is typically still smaller than the OFF-time, and the response type of the system as a whole is typically characterized by the slowest OFF-transition. In some embodiments, "softening" of the ON-edge may eliminate the audible noise during operation of the system.

It should be noted that, although specific mention is made of a polarization rotator used in the 3D systems based on a twisted nematic liquid crystal effect, it is not limited to this mode of operation. The audible buzzing may appear during driving a liquid crystal cell with a large surface areas and a small cell gap. In some embodiments, "softening" of the ON-edge of the driving waveform that is responsible for the buzzing may allow reduction or even elimination of the noise without compromising the system performance. In some embodiments, the polarization rotator may be used together with the active shutter glasses that always operate in the Normally White mode.

The performance characteristics (contrast) of the polarization rotator operating in a Normal White mode is enhanced with the higher applied voltage. However, if the polarization rotator cell has a large surface area, it leads to the audible buzzing at the driving frequencies. "Softening" of the ON-edge of the voltage waveform while keeping the voltage amplitude unchanged produces little change to the optical response of the system, but almost completely eliminates the buzzing level.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for operating a liquid crystal device, comprising:
   increasing a voltage provided to a driven level to a liquid crystal addressable element of the liquid crystal device, wherein said increasing is performed over a time period greater than 1 ms, and wherein the liquid crystal addressable element is in a driven state at the driven level; and
   reducing the provided voltage to a relaxed level, wherein the liquid crystal addressable element is in a relaxed state at the relaxed level;
   wherein said increasing the voltage over the time period to the driven level results in a reduced acoustical noise associated with the provided voltage.

2. The method of claim 1, wherein the liquid crystal addressable element comprises a polarization rotator.

3. The method of claim 1, wherein the liquid crystal addressable element comprises a polarization rotator based on a twisted nematic liquid crystal effect.

4. The method of claim 1, wherein the liquid crystal device comprises a three-dimensional (3D) display.

5. The method of claim 1, wherein the time period is greater than 2 ms, greater than 3 ms or greater than 4 ms.

6. The method of claim 1, further comprising reducing the provided voltage from the driven state to the relaxed state according to a step function.

7. The method of claim 1, wherein the time period is less than a second time period, and wherein the second time period comprises the time required to reduce the voltage to the relaxed level such that the liquid crystal addressable element is in the relaxed state.

8. The method of claim 1, wherein said increasing the provided voltage over the time period provides for a substantially equivalent performance relative to providing voltage using a standard square waveform.

9. A system for operating a liquid crystal device, comprising:
   a liquid crystal device comprising a liquid crystal addressable element;
   a voltage source which increases, during use, a voltage provided to a driven level to the liquid crystal addressable element of the liquid crystal device, wherein said increase is performed over a time period greater than 1 ms, and wherein the liquid crystal addressable element is in a driven state at the driven level; and
   wherein the voltage source reduces, during use, the provided voltage to a relaxed level, wherein the liquid crystal addressable element is in a relaxed state at the relaxed level; and
   wherein said increase of the voltage over the time period to the driven level results in a reduced acoustical noise associated with the provided voltage.

10. The system of claim 9, wherein the liquid crystal addressable element comprises a polarization rotator.

11. The system of claim 9, wherein the liquid crystal addressable element comprises a polarization rotator based on a twisted nematic liquid crystal effect.

12. The system of claim 9, wherein the liquid crystal device comprises a three-dimensional (3D) display.

13. The system of claim 9, wherein the time period is greater than 2 ms, greater than 3 ms or greater than 4 ms.

14. The system of claim 9, wherein the voltage source reduces, during use, the provided voltage from the driven state to the relaxed state according to a step function.

15. The system of claim 9, wherein the time period is less than a second time period, and wherein the second time period comprises the time required to reduce the voltage to the relaxed level such that the liquid crystal addressable element is in the relaxed state.

16. The system of claim 9, wherein increasing the provided voltage over the time period provides for a substantially equivalent performance relative to providing voltage using a standard square waveform.

17. A non-transitory computer readable storage medium containing program instructions executable to perform:

increasing a voltage provided to a driven level to a liquid crystal addressable element of the liquid crystal device, wherein said increasing is performed over a time period greater than 1 ms, and wherein the liquid crystal addressable element is in a driven state at the driven level; and reducing the provided voltage to a relaxed level, wherein the liquid crystal addressable element is in a relaxed state at the relaxed level;

wherein said increasing the voltage over the time period to the driven level results in a reduced acoustical noise associated with the provided voltage.

18. The non-transitory computer readable storage medium of claim 17, wherein the time period is greater than 2 ms, greater than 3 ms or greater than 4 ms.

19. The non-transitory computer readable storage medium of claim 17, further comprising reducing the provided voltage from the driven state to the relaxed state according to a step function.

20. The non-transitory computer readable storage medium of claim 17, wherein said increasing the provided voltage over the time period provides for a substantially equivalent performance relative to providing voltage using a standard square waveform.

* * * * *